United States Patent
Dementiev et al.

(10) Patent No.: US 10,540,524 B2
(45) Date of Patent: Jan. 21, 2020

(54) MEMORY ACCESS PROTECTION USING PROCESSOR TRANSACTIONAL MEMORY SUPPORT

(71) Applicant: McAfee, LLC, Santa Clara, CA (US)

(72) Inventors: Roman Dementiev, Heidelberg (DE); Igor Muttik, Berkhamsted (GB); Alex Nayshtut, Gan Yavne (IL)

(73) Assignee: McAfee, LLC, Santa Clara, CA (US)

( * ) Notice: Subject to any disclaimer, the term of this patent is extended or adjusted under 35 U.S.C. 154(b) by 134 days.

(21) Appl. No.: 14/670,982

(22) Filed: Mar. 27, 2015

(65) Prior Publication Data

US 2016/0188243 A1 Jun. 30, 2016

Related U.S. Application Data

(60) Provisional application No. 62/098,641, filed on Dec. 31, 2014.

(51) Int. Cl.
*G06F 3/06* (2006.01)
*G06F 21/79* (2013.01)

(52) U.S. Cl.
CPC .................... *G06F 21/79* (2013.01)

(58) Field of Classification Search
CPC .... G06F 3/0622; G06F 3/0673; G06F 3/0659; G06F 3/0637; G06F 21/79; G06F 9/467;
(Continued)

(56) References Cited

U.S. PATENT DOCUMENTS 6,321,314 B1 11/2001 Van Dyke
7,971,246 B1 * 6/2011 Emigh .................. G06F 21/552
726/22

(Continued)

FOREIGN PATENT DOCUMENTS

TW 201037525 10/2010
TW 201218080 5/2012
(Continued)

OTHER PUBLICATIONS

United States Patent and Trademark Office, "Non-Final Office Action", issued in connection with U.S. Appl. No. 14/228,842, dated Jan. 17, 2017 (11 pages).

(Continued)

*Primary Examiner* — Maung T Lwin
*Assistant Examiner* — Sanchit K Sarker
(74) *Attorney, Agent, or Firm* — Hanley, Flight & Zimmerman, LLC (57) ABSTRACT

Technologies for detecting unauthorized memory accesses include a computing device with a processor having transactional memory support. The computing device executes a security assistance thread that starts a transaction using the transactional memory support. Within the transaction, the security assistance thread writes arbitrary data to one or more monitored memory locations. The security assistance thread waits without committing the transaction. The security assistance thread may loop endlessly. The transactional memory support of the computing device detects a transactional abort caused by an external read of the monitored memory location. The computing device analyzes the transactional abort and determines whether a security event has occurred. The computing device performs a security response if a security event has occurred. The monitored memory locations may include memory-mapped operating system libraries, kernel data structures, executable images, or other memory structures that may be scanned by malicious software. Other embodiments are described and claimed.

18 Claims, 2 Drawing Sheets

(58) Field of Classification Search
CPC ......... G06F 21/554; G06F 2221/2141; G06F 2221/034; H04L 63/1416; H04L 63/1408
USPC ........................................... 726/22; 711/163
See application file for complete search history.

(56) References Cited

U.S. PATENT DOCUMENTS

| | | | |
|---|---|---|---|
| 8,180,971 | B2 | 5/2012 | Scott et al. |
| 8,356,166 | B2* | 1/2013 | Adl-Tabatabai ...... G06F 9/3004 712/220 |
| 8,396,937 | B1* | 3/2013 | O'Krafka ................. G06F 13/28 709/213 |
| 8,417,814 | B1 | 4/2013 | Hartmann |
| 8,515,075 | B1 | 8/2013 | Saraf et al. |
| 8,627,017 | B2 | 1/2014 | Sheaffer et al. |
| 8,640,230 | B2 | 1/2014 | Greenwood et al. |
| 8,688,917 | B2* | 4/2014 | Sheaffer ................ G06F 12/084 711/141 |
| 8,936,937 | B2* | 1/2015 | Lindbo .............. C12N 15/8205 435/320.1 |
| 9,384,148 | B2* | 7/2016 | Muttik ................ G06F 12/1441 |
| 2002/0166034 | A1 | 11/2002 | Koschella |
| 2003/0115479 | A1 | 6/2003 | Edwards et al. |
| 2004/0015712 | A1* | 1/2004 | Szor ..................... G06F 21/566 726/24 |
| 2004/0130347 | A1 | 7/2004 | Moll ..................... G06F 13/423 326/62 |
| 2005/0066354 | A1* | 3/2005 | Dellow .............. G06F 12/1483 725/30 |
| 2007/0261112 | A1* | 11/2007 | Todd ..................... G06F 21/577 726/11 |
| 2008/0083031 | A1 | 4/2008 | Meijer et al. |
| 2008/0084975 | A1* | 4/2008 | Schwartz .............. H04M 3/436 379/88.22 |
| 2008/0120484 | A1 | 5/2008 | Zhang et al. |
| 2008/0178292 | A1 | 7/2008 | Stauner |
| 2009/0287985 | A1* | 11/2009 | Okabe ................ G06F 11/1008 714/807 |
| 2010/0023706 | A1 | 1/2010 | Christie et al. |
| 2010/0131953 | A1 | 5/2010 | Dice et al. |
| 2010/0332753 | A1 | 12/2010 | Gray et al. |
| 2010/0332808 | A1* | 12/2010 | Adl-Tabatabai ...... G06F 9/3004 712/225 |
| 2011/0099335 | A1* | 4/2011 | Scott ................... G06F 12/0842 711/141 |
| 2012/0079245 | A1* | 3/2012 | Wang ................ G06F 9/30072 712/208 |
| 2012/0117334 | A1* | 5/2012 | Sheaffer ................ G06F 12/084 711/145 |
| 2014/0006692 | A1* | 1/2014 | Berntsen ............. G06F 12/0246 711/103 |
| 2014/0201835 | A1* | 7/2014 | Emigh ..................... G06F 21/55 726/23 |
| 2014/0282891 | A1* | 9/2014 | Frechette .............. H04L 63/083 726/4 |
| 2015/0278123 | A1* | 10/2015 | Nayshtut ................... G06F 9/48 711/163 |
| 2015/0312116 | A1* | 10/2015 | Taheri ..................... H04L 67/10 709/224 |
| 2016/0026581 | A1* | 1/2016 | Muttik ................ G06F 12/1441 726/26 |
| 2016/0034407 | A1* | 2/2016 | Shankar .................. G06F 13/28 710/22 |
| 2016/0180085 | A1* | 6/2016 | Muttik .................... G06F 21/56 726/23 |
| 2016/0188243 | A1* | 6/2016 | Dementiev ............. G06F 9/467 711/163 |

FOREIGN PATENT DOCUMENTS

| | | |
|---|---|---|
| TW | 201543258 | 11/2015 |
| WO | 03-069909 | 8/2003 |

OTHER PUBLICATIONS

International Search Report for PCT/US15/062903, dated Mar. 10, 2016 (3 pages).

Written Opinion for PCT/US15/062903, dated Mar. 10, 2016 (5 pages).

Dhawan, et al., "Enhancing Java Script with Transactions," Springer-Verlag Berlin Heidelberg, 7313, ECoop 2012, LNCS, pp. 383-408 (26 pages).

Jana, et al., "TxBox: Building Secure, Efficient Sandboxes with System Transactions," IEEE Symposium on Security and Privacy, 2011 (16 pages).

Liu, et al., "Concurrent and Consistent Virtual Machine Introspection with Hardware Transactional Memory," IEEE, 2014 (12 pages).

United States Patent and Trademark Office, "Final Office Action" issued in connection with U.S. Appl. No. 14/228,842 dated Apr. 24, 2019, 40 pages.

European Patent Office, "Communication under Rule 71(3) EPC" issued in connection with Application No. 15875898.7-1218, dated May 2, 2019, 27 pages.

Taiwanese Patent Office, "Office Action," dated May 16, 2017 in connection with Taiwanese Patent Application No. 104105594 (4 pages).

United States Patent and Trademark Office, "Final Office Action," issued in connection with U.S. Appl. No. 14/228,842, dated Oct. 10, 2017 (12 pages).

European Patent Office, "European Search Report," issued in connection with European Patent Application No. 15767767.5, dated Oct. 18, 2017 (11 pages).

Taiwanese Patent Office, "Notice of Allowance," dated Sep. 26, 2017 in connection with Taiwanese Patent Application No. 104105594, (3 pages).

Taiwanese Patent Office, "Office Action," dated May 28, 2019 in connection with Taiwanese Patent Application No. 106137163, (3 pages).

Taiwanese Patent Office, "Office Action," dated Jan. 2, 2019 in connection with Taiwanese Patent Application No. 106137163, (12 pages).

Taiwanese Patent Office, "Search Report," dated Jan. 2, 2019 in connection with Taiwanese Patent Application No. 106137163, (2 pages).

United States Patent and Trademark Office, "Non-Final Office Action," issued in connection with U.S. Appl. No. 14/228,842, dated Dec. 31, 2015 (31 pages).

United States Patent and Trademark Office, "Non-Final Office Action," issued in connection with U.S. Appl. No. 14/228,842, dated Jan. 17, 2017 (10 pages).

United States Patent and Trademark Office, "Final Office Action," issued in connection with U.S. Appl. No. 14/228,842, dated Jul. 5, 2016 (36 pages).

United States Patent and Trademark Office, "Non-Final Office Action," issued in connection with U.S. Appl. No. 14/228,842, dated Aug. 27, 2018 (37 pages).

United States Patent and Trademark Office, "Non-Final Office Action" issued in connection with U.S. Appl. No. 14/228,842 dated Oct. 4, 2019 (39 pages).

* cited by examiner

MEMORY ACCESS PROTECTION USING PROCESSOR TRANSACTIONAL MEMORY SUPPORT

CROSS-REFERENCE TO RELATED APPLICATION

The present application claims priority under 35 U.S.C. § 119(e) to U.S. Provisional Patent Application Ser. No. 62/098,641, entitled "MEMORY ACCESS PROTECTION USING PROCESSOR TRANSACTIONAL MEMORY SUPPORT," which was filed on Dec. 31, 2014.

BACKGROUND

One aspect of computer security involves protecting computer systems from malicious software, also known as "malware." Malware comes in many forms; however, many common varieties of malware perform reads or other accesses to unauthorized locations in computer memory. For example, certain malware scans computer memory to locate useful libraries or other code to access system APIs. Thus, a series of unusual memory reads may be a useful indicator of malicious activity. Unauthorized reads may be detected using page-based exceptions (i.e., page faults). Detecting unauthorized reads using page-based exceptions typically requires operating system and/or hypervisor support and may only detect reads at a relatively crude resolution (e.g., per each 4 k memory page).

Some computer processors provide support for hardware transactional memory. Transactional memory allows the programmer to designate a segment of code called a "transaction" to execute independently and atomically. That is, memory operations occurring within the transaction are not visible to other transactions or threads executing on the computing system until the transaction is successfully committed. After successful commit, all memory changes made during the transaction are instantaneously available to other threads on the system. Transactional memory may be implemented by speculatively executing the transaction, detecting any memory conflicts that occur during execution of the transaction, and then aborting and rolling back the transaction in response to memory conflicts. Memory conflicts include, for example, a transaction attempting to write to a memory location that has already been read or written-to by another transaction. Transactional memory may simplify the programming model for parallel computing. One commercially available example of hardware transactional memory support is Transactional Synchronization Extensions (Intel® TSX), available on certain processors manufactured by Intel® Corporation. Pending applications PCT/US2013/075805, filed on Dec. 17, 2013, and U.S. application Ser. No. 14/228,842, filed on Mar. 28, 2014, describe two techniques for detecting unauthorized memory writes (memory modifications) using hardware transactional memory support.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
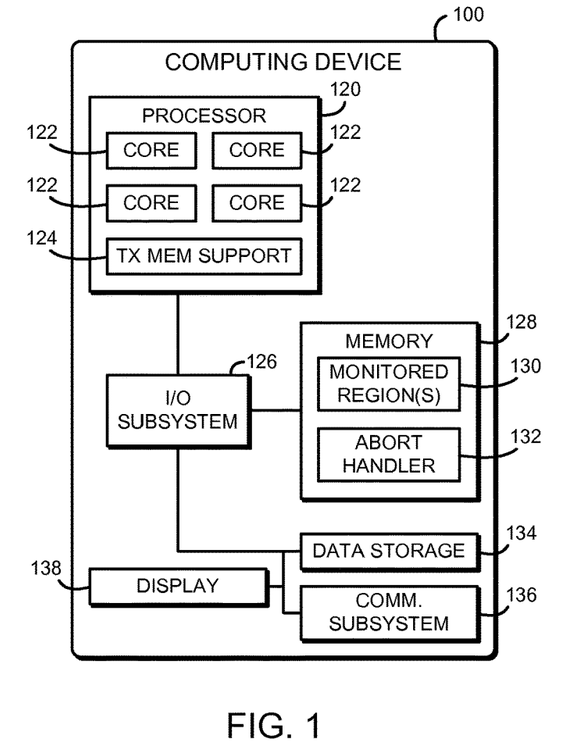
FIG. 1 is a simplified block diagram of at least one embodiment of a computing device for detection of unauthorized memory access.

Referring now to FIG. 1, an illustrative computing device 100 may be used for detection of unauthorized read access to one or more monitored memory regions. The computing device 100 executes a security thread that starts a transaction using hardware transactional memory support of a processor of the computing device 100. Within the transaction, the computing device 100 writes to one or more monitored memory regions without committing the transaction; that is, the computing device 100 executes one or more "uncommitted overwrites" to the monitored memory regions. The changes to the monitored memory regions are not visible to other threads executed by the computing device 100. Any read access originating from another thread to cache lines associated with the monitored memory regions immediately causes an abort of the security thread. In response to the abort, the computing device 100 performs a security analysis and may generate an appropriate security response. The computing device 100 may thus monitor for unauthorized memory reads using hardware support. Additionally, the computing device 100 monitors memory at the cache line level (e.g., 64 bytes), rather than the much coarser memory page level. Instant reaction to unauthorized reads may reduce time windows for exploitations. Further, the computing device 100 may improve ease of use by allowing creation of flexible, hardware-level memory monitors in software.

The computing device 100 may be embodied as any type of device for performing the functions described herein. For example, the computing device 100 may be embodied as, without limitation, a desktop computer, a server computer, a workstation, a laptop computer, a notebook computer, a mobile computing device, a smart phone, a tablet computer, a cellular telephone, a handset, a messaging device, a wearable computing device, a vehicle telematics device, a distributed computing system, a multiprocessor system, a consumer electronic device, and/or any other computing device configured to perform the functions described herein. As shown in FIG. 1, the illustrative computing device 100 includes a processor 120, an input/output subsystem 126, a memory 128, and a data storage device 134. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of processor capable of performing the functions described herein. The illustrative processor 120 is a multi-core processor; however, in other embodiments the processor 120 may be embodied as a single or multi-core processor(s), digital signal processor, microcontroller, or other processor or processing/controlling circuit. The illustrative processor 120 includes four processor cores 122, each of which is an independent processing unit capable of executing programmed instructions. Although the illustrative processor 120 includes four processor cores 122, the processor 120 may include a fewer or greater number of processor cores 122 in other embodiments. Additionally, although the illustrative computing device 100 includes a single processor 120, in some embodiments the computing device 100 may include more than one processor 120. For example, the computing device 100 may be embodied as a symmetric multiprocessing system with shared memory interconnects.

The illustrative processor 120 further includes hardware transactional memory support 124, which allows the processor 120 to speculatively execute segments of code known as transactions. Transactions are atomic, meaning that memory operations performed by a transaction while the transaction is pending are not visible to other transactions, cores 122, logical processors, and/or threads of the processor 120. When a transaction is completed, also known as committed, all of the memory operations of the transaction become available to the rest of the computing device 100 at once. When memory accesses within a transaction conflict with another transaction or thread, for example when a thread reads from a memory location that has been written to by an uncommitted transaction (or when two transactions and/or threads write to the same memory location), the processor 120 may abort the conflicting transaction(s), discarding any associated in-progress transactional memory changes. In particular, the processor 120 may "eagerly" abort the conflicting transaction immediately upon detecting a memory conflict, without waiting for the transaction to attempt to commit. The processor 120 may use a cache coherency mechanism to implement eager conflict detection. The processor 120 may detect conflicting memory locations at any level of granularity, for example per cache line, per word, or per memory cell. On abort, the processor 120 may call an abort handler, restart the transaction (once or multiple times), or invoke non-transactional fallback code in response to an aborted transaction. In some embodiments, the transactional memory support 124 may be embodied as Intel® Transactional Synchronization Extensions (Intel® TSX), available on certain processors 120 manufactured by Intel® Corporation.

The memory 128 may be embodied as any type of volatile or non-volatile memory or data storage capable of performing the functions described herein. In operation, the memory 128 may store various data and software used during operation of the computing device 100 such as operating systems, applications, programs, libraries, and drivers. The illustrative memory 128 includes one or more monitored memory regions 130 and an abort handler 132. As described further below, the monitored memory regions 130 are specific regions of memory monitored for attempted unauthorized memory access. Such monitored memory regions 130 may include loaded or memory-mapped libraries, executable images, kernel data structures, or other important memory regions. The abort handler 132 may include a routine or routines that are called in the event of a transactional abort to handle potential security violations, as described further below.

The memory 128 is communicatively coupled to the processor 120 via the I/O subsystem 126, which may be embodied as circuitry and/or components to facilitate input/output operations with the processor 120, the memory 128, and other components of the computing device 100. For example, the I/O subsystem 126 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may form a portion of a system-on-a-chip (SoC) and be incorporated, along with the processor 120, the memory 128, and other components of the computing device 100, on a single integrated circuit chip.

The data storage device 134 may be embodied as any type of device or devices configured for short-term or long-term storage of data such as, for example, memory devices and circuits, memory cards, hard disk drives, solid-state drives, or other data storage devices. The data storage device 134 may be used to store software or other data for execution including operating system software and application software. Such software may be initially untrusted and potentially malicious, for example, software downloaded from a third party vendor.

The computing device 100 further includes a communication subsystem 136, which may be embodied as any communication circuit, device, or collection thereof, capable of enabling communications between the computing device 100 and remote computing devices. The communication subsystem 136 may be configured to use any one or more communication technology (e.g., wireless or wired communications) and associated protocols (e.g., Ethernet, Bluetooth®, Wi-Fi®, WiMAX, HSPA+, LTE, etc.) to effect such communication. The communication subsystem 136 may be embodied as a network adapter, including a wireless network adapter.

In the illustrative embodiment, the computing device 100 further includes a display 138. The display 138 of the computing device 100 may be embodied as any type of display capable of displaying digital information such as a liquid crystal display (LCD), a light emitting diode (LED), a plasma display, a cathode ray tube (CRT), or other type of display device. The display 138 may be used, for example, to convey results of security analysis to a user.

Figure 2:
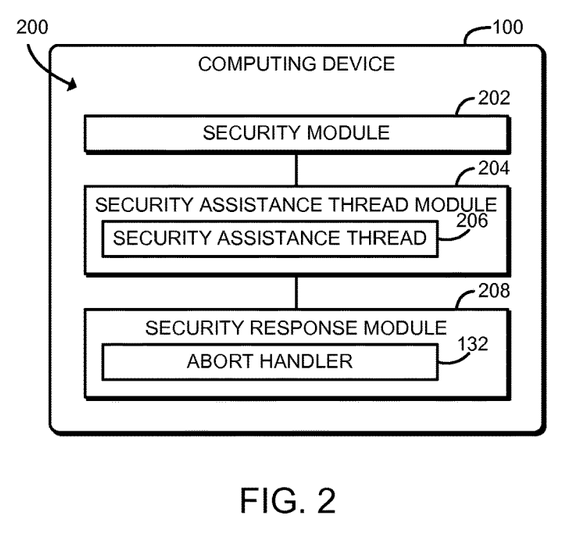
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative environment 200 includes a security module 202, a security assistance thread module 204, and a security response module 208. The various modules of the environment 200 may be embodied as hardware, firmware, software, or a combination thereof. For example the various modules, logic, and other components of the environment 200 may form a portion of, or otherwise be established by, the processor 120 or other hardware components of the computing device 100. As such, in some embodiments, any one or more of the modules of the environment 200 may be embodied as a circuit or collection of electrical devices (e.g., a security circuit, a security assistance thread circuit, etc.).

The security module 202 is configured to start one or more security assistance threads 206 to monitor the monitored memory regions 130. The security module 202 may be embodied as any security software having access to the monitored memory regions 130, and may be embodied as one or more operating systems, hypervisors, operating system modules, drivers, trusted code, or other security software. The security assistance threads 206 may each be embodied as any independent thread of execution runnable on a core 122 or logical processor of the computing device 100, such as an operating system thread, a lightweight process, an operating system process, operating system kernel thread, or a user software thread. On creation, each security assistance thread 206 may be supplied with the addresses of the monitored memory regions 130 or a part of the monitored memory regions 130. In some embodiments, rather than being newly created, the security assistance threads 206 may be selected from a thread pool or otherwise pre-generated.

The security assistance thread module 204 is configured to start, by a security assistance thread 206, a transaction using the transactional memory support 124 of the processor 120. The security assistance thread module 204 is further configured to write, by the security assistance thread 206, arbitrary data to the associated monitored memory region 130 from within the transaction. The security assistance thread module 204 is configured to detect transactional aborts of the transaction caused by an external read of the monitored memory region 130; that is, a read of the monitored memory region 130 that originates from code executing outside of the transaction. The security assistance thread module 204 may be configured to execute a transactional abort handler 132 in response to detection of the transactional abort.

The security response module 208 is configured to determine whether a security event has occurred in response to detection of the transactional abort and perform one or more security operations if a security event has occurred. Those functions may be executed by or as a part of the abort handler 132. The security response module 208 may be configured to report the security event or halt the computing device 100 in response to determining that a security event has occurred.

Figure 3:
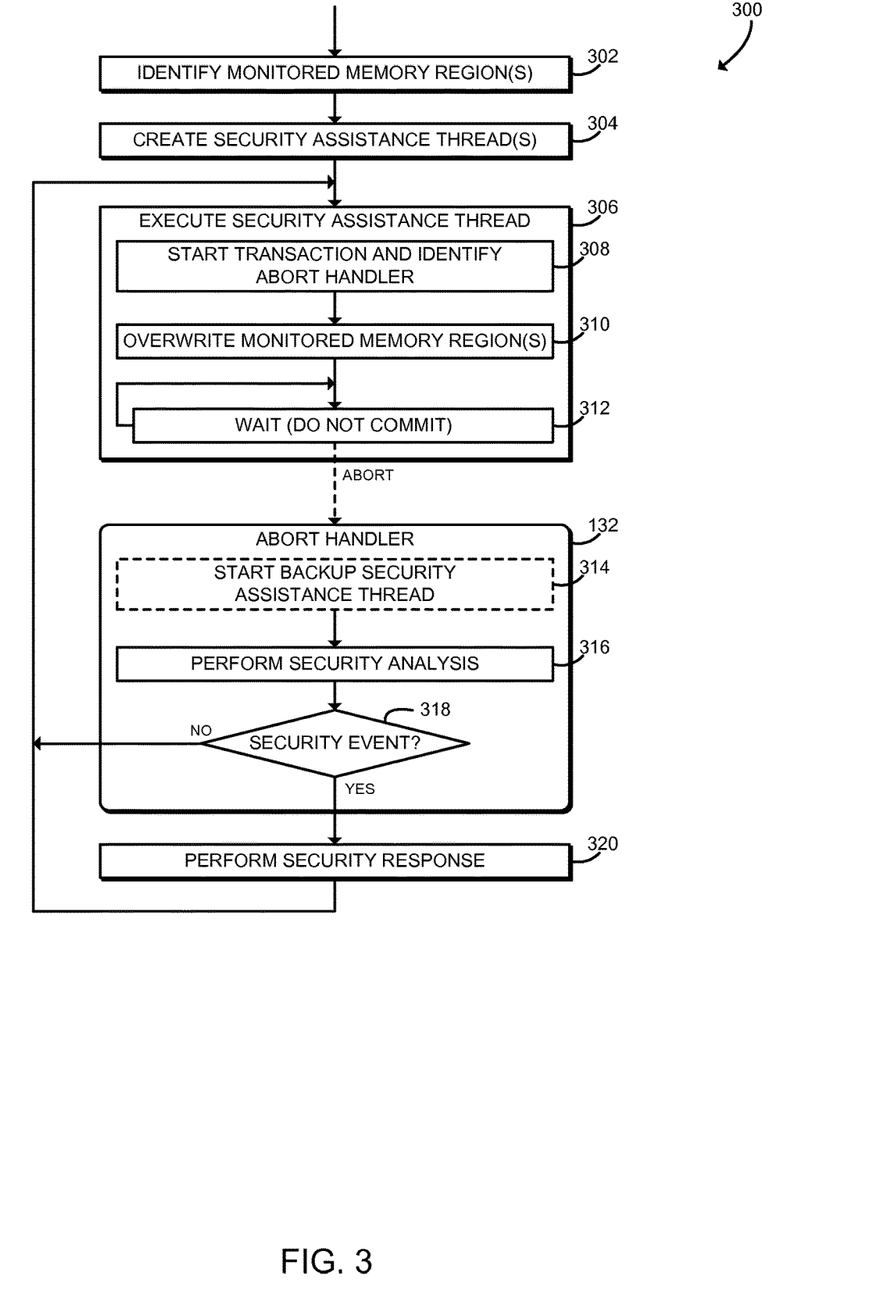
FIG. 3 is a simplified flow diagram of at least one embodiment of a method for detecting unauthorized memory access that may be executed by the computing device of FIGS. 1 and 2.

Referring now to FIG. 3, in use, the computing device 100 may execute a method 300 for detecting unauthorized memory accesses. The method 300 begins in block 302, in which the computing device 100 identifies one or more regions 130 of the memory 128 to monitor. Those monitored memory regions 130 may be embodied as any in-memory image, executable, or other data structure that is commonly scanned by malware. In some embodiments, the monitored memory regions 130 may include part or all of a loaded (memory-mapped) system library. For example, it is a common strategy for malicious code to scan the memory 128 for loaded operating system libraries such as the KERNEL32.DLL library of the Windows™ operating system. Malicious code may verify that a loaded portable executable (PE) image is KERNEL32.DLL by reading and interpreting data structures of the loaded image, such as the PE header, section table, and/or PE directory. Malicious code may, for example, determine the file type of the loaded image (e.g., PE or DLL), locate the export table, and loop through the export table to find pointers to functions for additional system penetration. Malicious code may commonly use the exports for the functions LoadModule and GetProcAddress, because those functions allow invocation by name of desired APIs from standard DLLs. Ordinary, non-malicious software may very rarely access the monitored memory regions 130.

In block 304, the computing device 100 creates one or more security assistance threads 206. As described above, the security assistance threads 206 may each be embodied as any independent thread of execution runnable on a core 122 or logical processor of the computing device 100, such as an operating system thread, a lightweight process, an operating system process, operating system kernel thread, or a user software thread. Each security assistance thread 206 may be assigned to part or all of the monitored memory regions 130. In some embodiments, the computing device 100 may create additional, backup security assistance threads 206 to allow for continuous monitoring and the absence of gaps in coverage.

In block 306, the computing device 100 executes each of the security assistance threads 206 associated with the monitored memory regions 130. The processes of block 306 (e.g., blocks 308, 310, 312) may be executed concurrently, in parallel, or otherwise contemporaneously by the security assistance threads 206. In block 308, the security assistance thread 206 starts a transaction and identifies an associated abort handler 132. In some embodiments, the transaction may be started by executing a particular instruction, for example the XBEGIN instruction. The address of the abort handler 132 may be passed as an argument to the transaction-begin instruction. Additionally or alternatively, a separate instruction may exist for specifying the address of the abort handler 132. As described above, if a transactional abort occurs during execution of the transaction, the processor 120 of the computing device 100 automatically transfers execution to the abort handler 132.

In block 310, the security assistance thread 206, still executing within the transaction, overwrites the monitored memory regions 130. The security assistance thread 206 may overwrite the monitored memory regions 130 with arbitrary values. The write operations may add memory cache lines associated with the monitored memory regions 130 into the write set of the transaction. Because transactions are isolated and atomic, the changes to the monitored memory regions 130 are not visible to other threads and/or processes executed by the computing device 100.

In block 312, the security assistance thread 206 enters an endless wait loop without committing the transaction. The security assistance thread 206 may use any technique to wait without committing the transaction, such as executing a loop, sleeping, or otherwise yielding execution of the security assistance thread 206. While waiting, any external reads of the monitored memory regions 130 (e.g., reads from another thread and/or transaction) cause a read/write conflict. The processor 120 detects read/write conflicts and aborts the transaction. The detection of memory conflicts and subsequent generation of transactional aborts may be performed by hardware of the processor 120, microcode of the processor 120, firmware, software, or any combination of those techniques. Detection of memory conflicts and other transactional aborts may be transparent to software executing on the processor 120, which may become aware of a transactional abort only after the abort handler 132 is called by the processor 120. If no read/write conflict occurs, the method 300 continues executing in block 312. If a read/write conflict occurs, the transaction is aborted and the method 300 transitions to the abort handler 132, beginning in block 314.

In some embodiments, in block 314, the computing device 100, executing from the abort handler 132, starts one or more backup security assistance threads 206. As described above, the computing device 100 may create or otherwise initialize backup security assistance threads 206 that are used to provide continuous monitoring of the monitored memory regions 130. The backup security assistance thread 206 may start a new transaction and write to the monitored memory regions 130 as described above in connection with block 306. Thus, the backup security assistance thread 206 may allow the computing device 100 to continue monitoring the monitored memory regions 130 while the abort handler 132 is executed.

In block 316, the computing device 100, executing from the abort handler 132, performs a security analysis in response to the transactional abort to determine whether a security event has occurred. A security event includes any unauthorized access to one or more of the monitored memory regions 130, such as an unauthorized read from a monitored memory region 130. Such unauthorized memory reads may be performed by malicious software such as rootkits attempting to identify and map operating system libraries prior to attempting to call arbitrary APIs, hook selected APIs, or otherwise subvert control of the computing device 100. The computing device 100 may analyze data describing the cause of the transactional abort to determine whether a security event has occurred, for example by reading an abort status register or a performance monitoring unit of the processor 120 to determine the cause of the abort, the address of the aborting instruction, the address of the conflicting data, or other information.

In block 318, the computing device 100 determines whether a security event has occurred. As described above, a security event may occur when malicious code from outside of the security assistance thread 206 reads from the monitored memory regions 130. If a security event has not occurred, the method 300 loops back to block 306 to execute the security assistance thread 206, restart the transaction, and continue monitoring the monitored memory regions 130. If a security event has occurred, the method 300 advances to block 320.

In block 320, the computing device 100 performs a security response. The computing device 100 may perform any appropriate security response, such as reporting the security event, terminating software that caused the transactional abort, or halting the computing device 100 to prevent potential execution of comprised code. The security event may be reported using any available technique, including displaying an interactive alert, generating a human readable report, or performing another security operation. After performing the security response the method 300 loops back to block 306 to execute the security assistance thread 206, restart the transaction, and continue monitoring the monitored memory regions 130.

EXAMPLES

Illustrative examples of the technologies disclosed herein are provided below. An embodiment of the technologies may include any one or more, and any combination of, the examples described below.

Example 1 includes a computing device for detecting unauthorized memory accesses, the computing device comprising a processor that includes transactional memory support; a security assistance thread module to start, by a security assistance thread of the computing device, a transaction using the transactional memory support of the processor; write, by the security assistance thread, to a monitored memory location in response to the start of the transaction; and detect a transactional abort of the transaction in response to the write to the monitored memory location, wherein the transactional abort is caused by a read of the monitored memory location and wherein the read is generated externally from the transaction; and a security response module to (i) determine whether a security event has occurred in response to detection of the transactional abort and (ii) perform a security operation in response to a determination that a security event has occurred.

Example 2 includes the subject matter of Example 1, and further including a security module to start the security assistance thread; wherein to start the transaction comprises to start the transaction in response to the start of the security assistance thread.

Example 3 includes the subject matter of any of Examples 1 and 2, and wherein the monitored memory location comprises a part of a memory-mapped operating system library.

Example 4 includes the subject matter of any of Examples 1-3, and wherein the monitored memory location comprises a part of an executable image.

Example 5 includes the subject matter of any of Examples 1-4, and wherein the monitored memory location comprises a part of an operating system kernel data structure.

Example 6 includes the subject matter of any of Examples 1-5, and wherein to detect the transactional abort comprises to wait, by the security assistance thread, without a commit of the transaction in response to the write to the monitored memory location.

Example 7 includes the subject matter of any of Examples 1-6, and wherein the security assistance thread module is further to execute a transactional abort handler in response to the detection of the transactional abort, wherein to execute the transactional abort handler comprises to determine whether a security event has occurred.

Example 8 includes the subject matter of any of Examples 1-7, and wherein to determine whether the security event has occurred comprises to compare a first memory address of a conflicting data location retrieved from a performance monitoring unit of the computing device to a second memory address of the monitored memory location.

Example 9 includes the subject matter of any of Examples 1-8, and wherein to determine whether the security event has occurred comprises to determine a cause of the transactional abort based on an abort status register of the computing device.

Example 10 includes the subject matter of any of Examples 1-9, and wherein to perform the security operation comprises to report the security event.

Example 11 includes the subject matter of any of Examples 1-10, and wherein to perform the security operation comprises to halt the computing device.

Example 12 includes the subject matter of any of Examples 1-11, and wherein the security assistance module is further to restart, by the security assistance thread, the transaction in response to a determination that a security event has not occurred.

Example 13 includes the subject matter of any of Examples 1-12, and wherein the security module is further to start a second security assistance thread in response to detection of the transactional abort; and the security assistance thread module is further to start, by the second security assistance thread of the computing device, a second transaction using transactional memory support of the processor of the computing device; and write, by the second security assistance thread, to the monitored memory location in response to the start of the second transaction.

Example 14 includes a method for detecting unauthorized memory accesses, the method comprising starting, by a security assistance thread of a computing device, a transaction using transactional memory support of a processor of the computing device; writing, by the security assistance thread, to a monitored memory location in response to starting the transaction; detecting, by the computing device, a transactional abort of the transaction in response to writing to the monitored memory location, wherein the transactional abort is caused by a read of the monitored memory location and wherein the read is generated externally from the transaction; determining, by the computing device, whether a security event has occurred in response to detecting the transactional abort; and performing, by the computing device, a security operation in response to determining that a security event has occurred.

Example 15 includes the subject matter of Example 14, and further including starting, by the computing device, the security assistance thread; wherein starting the transaction comprises starting the transaction in response to starting the security assistance thread.

Example 16 includes the subject matter of any of Examples 14 and 15, and wherein the monitored memory location comprises a part of a memory-mapped operating system library.

Example 17 includes the subject matter of any of Examples 14-16, and wherein the monitored memory location comprises a part of an executable image.

Example 18 includes the subject matter of any of Examples 14-17, and wherein the monitored memory location comprises a part of an operating system kernel data structure.

Example 19 includes the subject matter of any of Examples 14-18, and wherein detecting the transactional abort comprises waiting, by the security assistance thread, without committing the transaction in response to writing to the monitored memory location.

Example 20 includes the subject matter of any of Examples 14-19, and further including executing, by the computing device, a transactional abort handler in response to detecting the transactional abort, wherein executing the transactional abort handler comprises determining whether the security event has occurred.

Example 21 includes the subject matter of any of Examples 14-20, and wherein determining whether the security event has occurred comprises comparing a first memory address of a conflicting data location retrieved from a performance monitoring unit of the computing device to a second memory address of the monitored memory location.

Example 22 includes the subject matter of any of Examples 14-21, and wherein determining whether the security event has occurred comprises determining a cause of the transactional abort based on an abort status register of the computing device.

Example 23 includes the subject matter of any of Examples 14-22, and wherein performing the security operation comprises reporting the security event.

Example 24 includes the subject matter of any of Examples 14-23, and wherein performing the security operation comprises halting the computing device.

Example 25 includes the subject matter of any of Examples 14-24, and further including restarting, by the security assistance thread, the transaction in response to determining that a security event has not occurred.

Example 26 includes the subject matter of any of Examples 14-25, and further including starting, by a computing device, a second security assistance thread in response to detecting the transactional abort; starting, by the second security assistance thread of the computing device, a second transaction using transactional memory support of the processor of the computing device; and writing, by the second security assistance thread, to the monitored memory location in response to starting the second transaction.

Example 27 includes a computing device comprising a processor; and a memory having stored therein a plurality of instructions that when executed by the processor cause the computing device to perform the method of any of Examples 14-26.

Example 28 includes one or more machine readable storage media comprising a plurality of instructions stored thereon that in response to being executed result in a computing device performing the method of any of Examples 14-26.

Example 29 includes a computing device comprising means for performing the method of any of Examples 14-26.

Example 30 includes a computing device for detecting unauthorized memory accesses, the computing device comprising means for starting, by a security assistance thread of the computing device, a transaction using transactional memory support of a processor of the computing device; means for writing, by the security assistance thread, to a monitored memory location in response to starting the transaction; means for detecting a transactional abort of the transaction in response to writing to the monitored memory location, wherein the transactional abort is caused by a read of the monitored memory location and wherein the read is generated externally from the transaction; means for determining whether a security event has occurred in response to detecting the transactional abort; and means for performing a security operation in response to determining that a security event has occurred.

Example 31 includes the subject matter of Example 30, and further including means for starting the security assistance thread; wherein the means for starting the transaction comprises means for starting the transaction in response to starting the security assistance thread.

Example 32 includes the subject matter of any of Examples 30 and 31, and wherein the monitored memory location comprises a part of a memory-mapped operating system library.

Example 33 includes the subject matter of any of Examples 30-32, and wherein the monitored memory location comprises a part of an executable image.

Example 34 includes the subject matter of any of Examples 30-33, and wherein the monitored memory location comprises a part of an operating system kernel data structure.

Example 35 includes the subject matter of any of Examples 30-34, and wherein the means for detecting the transactional abort comprises means for waiting, by the security assistance thread, without committing the transaction in response to writing to the monitored memory location.

Example 36 includes the subject matter of any of Examples 30-35, and further including means for executing a transactional abort handler in response to detecting the transactional abort, wherein the means for executing the transactional abort handler comprises means for determining whether the security event has occurred.

Example 37 includes the subject matter of any of Examples 30-36, and wherein the means for determining whether the security event has occurred comprises means for comparing a first memory address of a conflicting data location retrieved from a performance monitoring unit of the computing device to a second memory address of the monitored memory location.

Example 38 includes the subject matter of any of Examples 30-37, and wherein the means for determining whether the security event has occurred comprises means for determining a cause of the transactional abort based on an abort status register of the computing device.

Example 39 includes the subject matter of any of Examples 30-38, and wherein the means for performing the security operation comprises means for reporting the security event.

Example 40 includes the subject matter of any of Examples 30-39, and wherein the means for performing the security operation comprises means for halting the computing device.

Example 41 includes the subject matter of any of Examples 30-40, and further including means for restarting, by the security assistance thread, the transaction in response to determining that a security event has not occurred.

Example 42 includes the subject matter of any of Examples 30-41, and further including means for starting a second security assistance thread in response to detecting the transactional abort; means for starting, by the second security assistance thread of the computing device, a second transaction using transactional memory support of the processor of the computing device; and means for writing, by the second security assistance thread, to the monitored memory location in response to starting the second transaction.

The invention claimed is:

1. A computing device comprising:
a security assistance thread module to execute a security assistance thread, the security assistance thread to:
start a transaction using transactional memory support;
within the transaction, write dummy data to a monitored memory location, the monitored memory location to be monitored for attempted unauthorized memory access; and
enter an endless wait loop without committing the transaction, the transaction to trigger a transactional abort in response to a read of the monitored memory location, the read initiated externally from the transaction; and
detect the transactional abort of the transaction; and
a security response module to, in response to the detecting of the transactional abort: (i) determine whether the read of the monitored memory location is caused by malware, and (ii) when the read is determined to be caused by malware, perform at least one of: (a) terminate a software program containing the malware, (b) generate a report, or (c) halt the computing device.

2. The computing device of claim 1, wherein the monitored memory location includes a part of a memory-mapped operating system library.

3. The computing device of claim 1, wherein the monitored memory location includes a part of an executable image.

4. The computing device of claim 1, wherein the monitored memory location includes a part of an operating system kernel data structure.

5. The computing device of claim 1, wherein the security response module is to launch a transactional abort handler in response to the detection of the transactional abort, the transactional abort handler to make the determination of whether the read is caused by malware.

6. The computing device of claim 1, wherein the security response module is to determine whether the read is caused by malware by comparing a first memory address of a conflicting data location retrieved from a performance monitoring unit of the computing device to a second memory address of the monitored memory location.

7. The computing device of claim 1, wherein the security response module is to determine whether the read is caused by malware by accessing an abort status register of the computing device.

8. The computing device of claim 1, wherein the transaction is a first transaction, the security assistance thread is a first security assistance thread, the security assistance thread module is further to cause a second security assistance thread to execute in response to the detection of the transactional abort, and the second security assistance thread is to start a second transaction using transactional memory support of the computing device; and, in response to the start of the second transaction, the second security assistance thread is to write to the monitored memory location.

9. The computing device of claim 1, wherein at least one of the security assistance thread module, the security assistance thread, or the security response module is to be implemented by a processor.

10. The computing device of claim 1, wherein the monitored memory location is associated with a memory cache line.

11. A method to detect malicious code, the method comprising:
  initiating a transaction using transactional memory support of a processor, the transaction to trigger a transactional abort in response to a read of a monitored memory location, the monitored memory location to be monitored for attempted unauthorized memory accesses, the transaction to include writing dummy data to the monitored memory location and entering an endless wait loop without committing the transaction;
  in response to the transactional abort, determining, by executing an instruction with a processor, whether the read of the monitored memory location is caused by malicious code; and
  at least one of: (a) terminating a software program associated with the malicious code, (b) generating a report, or (c) halting a computing device, in response to determining that the read of the monitored memory location is caused by the malicious code.

12. The method of claim 11, wherein the monitored memory location includes at least one of: (a) a part of a memory-mapped operating system library, (b) a part of an executable image, or (c) a part of an operating system kernel data structure, the method further including executing, with the processor, a transactional abort handler in response to the transactional abort, the transactional abort handler to perform the determining of whether the read of the monitored memory location is caused by the malicious code.

13. The method of claim 11, wherein the transaction is a first transaction, and the method further includes:
  generating, by executing an instruction with the processor, an assistance thread in response to the transactional abort;
  starting, by executing the assistance thread with the processor, a second transaction using the transactional memory support; and
  writing dummy data, by executing the assistance thread with the processor, to the monitored memory location.

14. One or more computer readable storage devices or storage disks comprising a plurality of instructions that, when executed, cause at least one processor to at least:
  spawn a security assistance thread, the security assistance thread to start a transaction without committing the transaction, the transaction using transactional memory support, the transaction to include a write to a monitored memory location, the monitored memory location to be monitored for attempted unauthorized memory accesses, the transaction to trigger a transactional abort in response to a read of the monitored memory location, the read generated by instructions executing outside of the security assistance thread;
  in response to the transactional abort, determine whether the read of the monitored memory location was caused by malicious instructions; and
  in response to determining that the read of the monitored memory location was caused by the malicious instructions, at least one of: (a) terminate a software program associated with the malicious instructions, (b) generate a report, or (c) halt a computing device.

15. The one or more computer-readable storage devices or storage disks of claim 14, wherein the security assistance thread, when executed, causes the at least one processor to, after the write, enter an endless wait loop without committing the transaction.

16. The one or more computer-readable storage devices or storage disks of claim 14, wherein the monitored memory location includes at least one of: (a) a part of a memory-mapped operating system library, (b) a part of an executable image, or (c) a part of an operating system kernel data structure, the instructions cause the at least one processor to execute a transactional abort handler in response to detecting the transactional abort, the transactional abort handler to make the determination of whether the read was caused by malicious instructions.

17. The one or more computer-readable storage devices or storage disks of claim 14, wherein the security assistance thread is a first security assistance thread, the read is a first read, the transaction is a first transaction and the transactional abort is a first transactional abort, the instructions further to cause the at least one processor to:
  start a second security assistance thread in response to detecting the first transactional abort; and
  detect, with the security assistance thread, a second transactional abort caused by a second read of the monitored memory location.

18. The one or more computer readable storage devices or storage disks of claim 14, wherein the monitored memory location is associated with a memory cache line.

* * * * *